US012726450B1

(12) United States Patent
Elson et al.

(10) Patent No.: US 12,726,450 B1
(45) Date of Patent: Sep. 1, 2026

(54) CHATBOT FOR REPORTING AND INVESTIGATING THREATS

(71) Applicant: Board of Regents of the University of Nebraska, Lincoln, NE (US)

(72) Inventors: Joel Elson, Elkhorn, NE (US); Doug Derrick, Papillion, NE (US); Erin Kearns, Omaha, NE (US); Jack Rygg, Omaha, NE (US); Sam Schneider, Omaha, NE (US); Bradley Corwin, Omaha, NE (US); Aiden Barger, Omaha, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 0 days.

(21) Appl. No.: 18/764,558

(22) Filed: Jul. 5, 2024

Related U.S. Application Data

(63) Continuation of application No. 18/482,189, filed on Oct. 6, 2023, now Pat. No. 12,069,010.

(60) Provisional application No. 63/385,798, filed on Dec. 2, 2022, provisional application No. 63/385,799, filed on Dec. 2, 2022, provisional application No. 63/378,631, filed on Oct. 6, 2022.

(51) Int. Cl.

| | |
|---|---|
| ***H04L 12/58*** | (2006.01) |
| ***G06F 40/20*** | (2020.01) |
| ***G06T 19/00*** | (2011.01) |
| ***H04L 51/02*** | (2022.01) |

(52) U.S. Cl.
CPC .............. *H04L 51/02* (2013.01); *G06F 40/20* (2020.01); *G06T 19/006* (2013.01)

(58) Field of Classification Search
CPC ......... H04L 51/02; H04L 51/23; H04L 51/58; G06F 40/20; G06T 19/006; G06B 7/12; G06B 7/07
USPC .......................................................... 709/206
See application file for complete search history.

(56) References Cited

U.S. PATENT DOCUMENTS

| | | | |
|---|---|---|---|
| 8,250,025 | B2 | 8/2012 | Ferraro et al. |
| 9,691,386 | B2 | 6/2017 | Formhals et al. |
| 10,997,785 | B2 | 5/2021 | Pestov |
| 12,062,277 | B2 | 8/2024 | Beaver et al. |

(Continued)

OTHER PUBLICATIONS

Shekhar, S., Feiner, S. & Aref, W.G. “From GPS and virtual globes to spatial computing—2020.” Geoinformatica. 19, 799-832 (2015).

(Continued)

*Primary Examiner* — Jude Jean Gilles
(74) *Attorney, Agent, or Firm* — Meunier Carlin & Curfman LLC

(57) ABSTRACT

A system for reporting and investigating threats includes one or more computer processors configured to: present a chatbot via a user interface device; request response data associated with a threat inquiry via the chatbot by requesting freeform response data associated with the threat inquiry via the chatbot and transitioning to intelligent question-path selection to collect additional response data associated with the threat inquiry, wherein the intelligent question-path selection is prompted by the freeform response data; record user input response data; and identify suspicious activity based on the user input response data by performing natural language analysis and searching the user input response data for threat related words or phrases.

20 Claims, 20 Drawing Sheets

(56) References Cited

U.S. PATENT DOCUMENTS

| | | | | |
|---|---|---|---|---|
| 12,069,010 | B1 * | 8/2024 | Elson | G06F 40/20 |
| 12,651,123 | B2 | 6/2026 | Kaleko | |
| 2013/0212693 | A1 | 8/2013 | Etchegoyen | |
| 2015/0324396 | A1 | 11/2015 | Sheik Adam et al. | |
| 2018/0131645 | A1 * | 5/2018 | Magliozzi | G06F 40/30 |
| 2018/0337872 | A1 | 11/2018 | Fawcett | |
| 2019/0095863 | A1 | 3/2019 | Spaulding et al. | |
| 2020/0169554 | A1 | 5/2020 | Trim et al. | |
| 2020/0226834 | A1 | 7/2020 | LeFevre | |
| 2021/0150150 | A1 | 5/2021 | Wu | |
| 2022/0076283 | A1 | 3/2022 | Oliveira et al. | |
| 2022/0309942 | A1 * | 9/2022 | Kawamura | G09B 7/02 |
| 2023/0336573 | A1 | 10/2023 | Jones | |

OTHER PUBLICATIONS

Lathan, C. E. & Ling, G. "Spatial Computing Could Be the Next Big Thing—Beyond virtual and augmented reality." Scientific American. (Nov. 20, 2020).

Guedez, Alexander. "How Spatial Computing Can Change Life And Work." Forbes. (Jun. 8, 2021).

"Strategic Intelligence Assessment and Data on Domestic Terrorism." Published by the Federal Bureau of Investigation & Department of Homeland Security. (May 2021).

"How to Report Suspicious Activity." Online portal. Published by the Department of Homeland Security. https://www.dhs.gov/see-something-say-something/how-to-report-suspicious-activity.

"Electronic Tip Form." Online portal. Published by the Federal Bureau of Investigation. https://tips.fbi.gov/home.

"Cyber Security: AI Chatbot Launched to Help Fight Nationwide Cyber Crime." business abc. (Sep. 8, 2022).

"RAInbow: Chatbot to Support Victims of Domestic Abuse." AI for Good—South Africa/Global. World Justice Project. (2021).

Surana, S., Chekkala, J., & Bihani, P. (2021). Chatbot based Crime Registration and Crime Awareness System using a custom Named Entity Recognition Model for Extracting Information from Complaints. International Research Journal of Engineering and Technology (IRJET), vol. 8, issue 4, Apr. 2021.

* cited by examiner

CHATBOT FOR REPORTING AND INVESTIGATING THREATS

CROSS-REFERENCE TO RELATED APPLICATIONS

The present application is a Continuation of U.S. Non-provisional application Ser. No. 18/482,189, filed Oct. 6, 2023, and titled "CHATBOT FOR REPORTING AND INVESTIGATING THREATS," which claims priority under 35 U.S.C. § 119(e) to U.S. Provisional Application Ser. No. 63/378,631, filed Oct. 6, 2022, and titled "CHATBOT FOR REPORTING AND INVESTIGATING THREATS," U.S. Provisional Application Ser. No. 63/385,798, filed Dec. 2, 2022, and titled "SYSTEM AND METHOD FOR ANONYMOUS SUBMISSION TRACKING WITH INTELLIGENT UPDATES," and U.S. Provisional Application Ser. No. 63/385,799, filed Dec. 2, 2022, and titled "SYSTEM AND METHOD FOR GENERATING RECALLABLE ANONYMOUS UNIQUE IDENTIFIER TOKENS," all of which are fully incorporated herein by reference.

STATEMENT OF GOVERNMENT SUPPORT

The invention was made with U.S. government support under grant numbers 20STTPC00001, 45-0108-1006-100, and DHS-21-TTP-132-00-01 awarded by the Department of Homeland Security. The U.S. government has certain rights in the invention.

TECHNICAL FIELD

The present disclosure generally relates to internet communications, more specifically to the use of chatbot technology to facilitate semi-automated dialogue with participants over the internet for reporting of suspicious activity related to terrorism and targeted violence (TTV).

BACKGROUND

Many threats that may lead to domestic terrorism or other incidents go unreported due to communication gaps between people having information and the proper authorities. For example, people may not know which authorities to contact, or people may contact proper authorities to report threats but feel uncomfortable divulging all the details that are necessary to investigate a threat and prevent a related incident.

Websites can be used to collect larger swathes of information. Threat/incident reporting websites typically rely on people to enter details of a perceived threat with little to no guidance, or people are asked to complete a long questionnaire. The result is that most people either provide too little information due to lack of guidance or they fail to complete the questionnaire because they are intimidated by the length of the questionnaire or because they become exhausted or lose interest after completing only a portion of the questions.

Chatbots have distinct advantages compared to traditional methods of gathering data. For example, people are more engaged and connected with a chatbot, which can improve the amount or types of disclosures. Furthermore, people tend to feel more comfortable sharing information with a chatbot than with a person because of an increased sense of anonymity. People also tend to feel less threatened or judged when communicating with a chatbot. Consequently, chatbots may provide an advantage over traditional methods of reporting and investigating threats.

SUMMARY

A system for reporting and investigating threats is disclosed. The system employs an intelligent chatbot for terrorism and targeted violence (TTV) tips reporting and general inquiry that can be used either as a stand-alone tool or be integrated into existing tips reporting platforms. This chatbot-based system helps individuals explore what types of suspicious activity or other indicators of concern. Additionally, the system can be used to submit and automatically route suspicious activity to necessary authorities. This system may be deployed across social media networks, websites, and other internet services to provide a safe and trusted place to inquire and report suspicious activity related to domestic violence and extremism.

In embodiments, the system includes one or more computer processors configured to: present a chatbot via a user interface device; request response data associated with a threat inquiry via the chatbot by requesting freeform response data associated with the threat inquiry via the chatbot and transitioning to intelligent question-path selection to collect additional response data associated with the threat inquiry, wherein the intelligent question-path selection is prompted by the freeform response data; record user input response data; and identify suspicious activity based on the user input response data by performing natural language analysis and searching the user input response data for threat related words or phrases.

In some embodiments, the system is configured for anonymous submission tracking with intelligent updates. For example, the one or more computer processors may be further configured to: generate a URL to a webpage associated with the user input response data; and present a status associated with the user input response data on the webpage.

As progress on a submission (e.g., a form, a report, chatbot dialogue, etc.) is made or after key temporal milestones are reached, the system may generate intelligent status updates that are unique to the individual who submitted the form. For example, a system may be configured to increase likelihood of submission, so status updates would be tailored to enhance an individual's sense of contribution or satisfaction from submission. Alternative outcomes might be desired so the system could intelligently adapt based on an analysis of the submission itself.

Individuals can anonymously return to the webpage/portal to check on the status of their submission. The individuals may be required to enter a token (e.g., a unique identifier, passcode, etc.) to gain access to the information and/or status updates.

In some embodiments, the system is configured to generate recallable anonymous unique identifier tokens. For example, one or more computer processors may be further configured to: present a set of questions to a user at a first point in time; and generate a recallable anonymous unique identifier token for the user based on answers to the set of questions. To recall the token, the one or more computer processors may be further configured to: present the same set of questions to the user at another (later) point in time; and regenerate the recallable anonymous unique identifier token for the user upon receiving the same answers to the same set of questions.

The anonymous unique identifier token generator (system described above) may generate a unique identifier based on temporal, environmental, and/or individual factors. Using input information that is easily recalled at a later date, the system generates a unique identifier that can be linked with data and used to call up data records at a later date. This identifier can be displayed in any combination of images, string of text, patterns/codes, etc.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The Detailed Description is provided with reference to the accompanying Drawings. The use of the same reference numbers in different instances in the Detailed Description and the Drawings may indicate similar or identical items. The Drawings are not necessarily to scale, and any disclosed processes may be performed in an arbitrary order, unless a certain order of steps/operations is inherent or specified in the Detailed Description or in the Claims.

DETAILED DESCRIPTION

A system for reporting and investigating threats is disclosed. The system employs an intelligent chatbot for terrorism and targeted violence (TTV) tips reporting and general inquiry that can be used either as a stand-alone tool or be integrated into existing tips reporting platforms. This chatbot-based system helps individuals explore what types of suspicious activity or other indicators of concern. Additionally, the system can be used to submit and automatically route suspicious activity to necessary authorities. This system may be deployed across social media networks, websites, and other internet services to provide a safe and trusted place to inquire and report suspicious activity related to domestic violence and extremism.

Figure 1A:
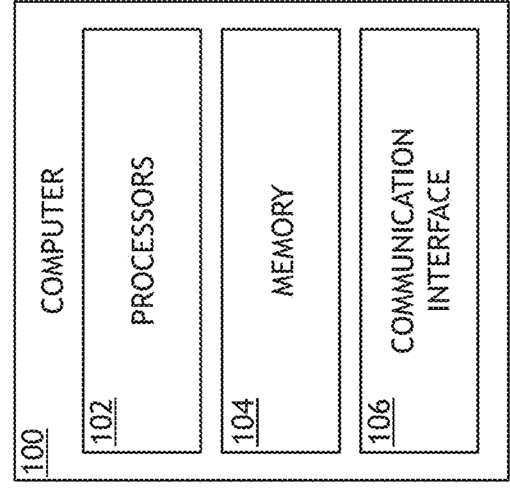
FIG. 1A is a block diagram of a computer that can be used to present a chatbot for reporting and investigating threats, in accordance with an embodiment of the present disclosure.

FIG. 1A is a block diagram of a computer 100 that is configured to present a portal, preferably an internet-based web portal, that includes a chatbot for reporting and investigating threats. For example, the chatbot may be implemented by coded instructions that are executed by the computer 100 or relayed by the computer 100 from another computer via an internet or intranet connection (see FIG. 1B). In embodiments, the chatbot is hosted on the internet for access via a website or an App (e.g., smartphone application, computer application, widget, or browser-based application).

Figure 1B:
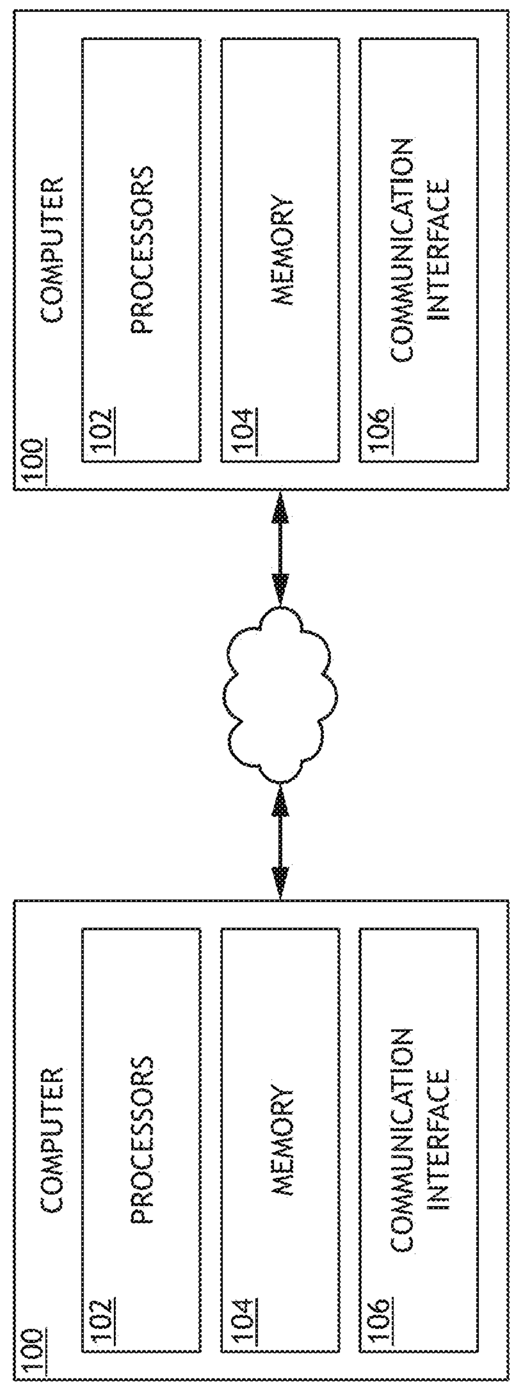
FIG. 1B is a block diagram of a connected system of computers that can be used to present a chatbot for reporting and investigating threats, in accordance with an embodiment of the present disclosure.

The computer 100 in FIG. 1A, or each computer 100 in FIG. 1B, may include at least one processor 102, memory 104, and communication interface 106. As used herein, the term "computer" may include a personal computer, notebook, mobile device (e.g., smartphone, tablet, smart wearable device, extended reality (XR) headset, etc.), server, cloud-computing network, or the like.

The processor 102 provides processing functionality for at least the computer 100 and can include any number of processors, microprocessors, microcontrollers, circuitry, field programmable gate array (FPGA) or other processing systems and resident or external memory for storing data, executable code and other information accessed or generated by the computer 100. The processor 102 can execute one or more software programs embodied in a non-transitory computer readable medium (e.g., memory) that implement techniques/operations described herein. The processor 102 is not limited by the materials from which it is formed, or the processing mechanisms employed therein and, as such, can be implemented via semiconductor(s) and/or transistors (e.g., using electronic integrated circuit (IC) components), and so forth.

The memory 104 may include any tangible, computer-readable storage medium that provides storage functionality to store various data and/or program code associated with operation of the computer 100/processor 102, such as software programs and/or code segments, or other data to instruct the processor 102, and possibly other components of the computer 100, to perform the functionality described herein. Thus, the memory 104 can store data, such as a program of instructions for operating the computer 100, including its components (e.g., processor 102, communication interface 106, etc.), and so forth. It should be noted that while a single memory is described, a wide variety of types and combinations of memory (e.g., tangible, non-transitory memory) can be employed. The memory 104 can be integrated within the processor 102, can comprise stand-alone memory, or can be a combination of both. Some examples of the memory 104 can include removable and non-removable memory components, such as random-access memory (RAM), read-only memory (ROM), flash memory (e.g., a secure digital (SD) memory card, a mini-SD memory card and/or a micro-SD memory card), solid-state drive (SSD) memory, magnetic memory, optical memory, universal serial bus (USB) memory devices, hard disk memory, external memory, or the like.

The communication interface 106 can be operatively configured to communicate with components of the computer 100. For example, the communication interface 106 can be configured to retrieve data from the processor 102 or other devices, transmit data for storage in the memory 104, retrieve data from storage in the memory 104, and so forth. The communication interface 106 can also be communicatively coupled with the processor 102 to facilitate data transfer between components of the computer 100 and the processor 102. It should be noted that while the communication interface 106 is described as a component of the computer 100, one or more components of the communication interface 106 can be implemented as external components communicatively coupled to the computer 100 via a wired and/or wireless connection. The computer 100 can also include and/or connect to one or more input/output (I/O) devices (e.g., via the communication interface 106), such as an input device (e.g., a trackpad, a touchpad, a touchscreen, a keyboard, a keypad, a microphone (e.g., for voice-to-text inputs or voice commands), camera, inertial sensor, etc.) and/or an output device (e.g., a display, a speaker, a tactile feedback device, etc.). In embodiments, the communication interface 106 may also include or may be coupled with a transmitter, receiver, transceiver, physical connection interface, or any combination thereof.

It shall be understood that any of the functions, steps or operations described herein are not necessarily all performed by one computer 100. In some embodiments, various functions, steps, or operations may be performed by one or more computers 100. For example, one or more operations and/or sub-operations may be performed by a first computer, additional operations and/or sub-operations may be performed by a second computer, and so forth. Furthermore, some of the operations and/or sub-operations may be performed in parallel and not necessarily in the order that they are disclosed herein.

The computer 100 is configured to present a chatbot 200 (see FIGS. 2A through 2K) via a user interface device (e.g., a computer monitor or TV, mobile device display screen, head-mounted display, etc.). The computer 100 is further configured to cause the chatbot 200 to perform all the functions of the chatbot 200 described herein. For example, the processor 102 may be configured to execute a program of instructions from memory 104 that cause the processor 102 to present the chatbot 200, provide queries and information to a user via the chatbot 200, receive user input response data (or user input queries) via the chatbot 200, and analyze the user input data.

Figure 2A:
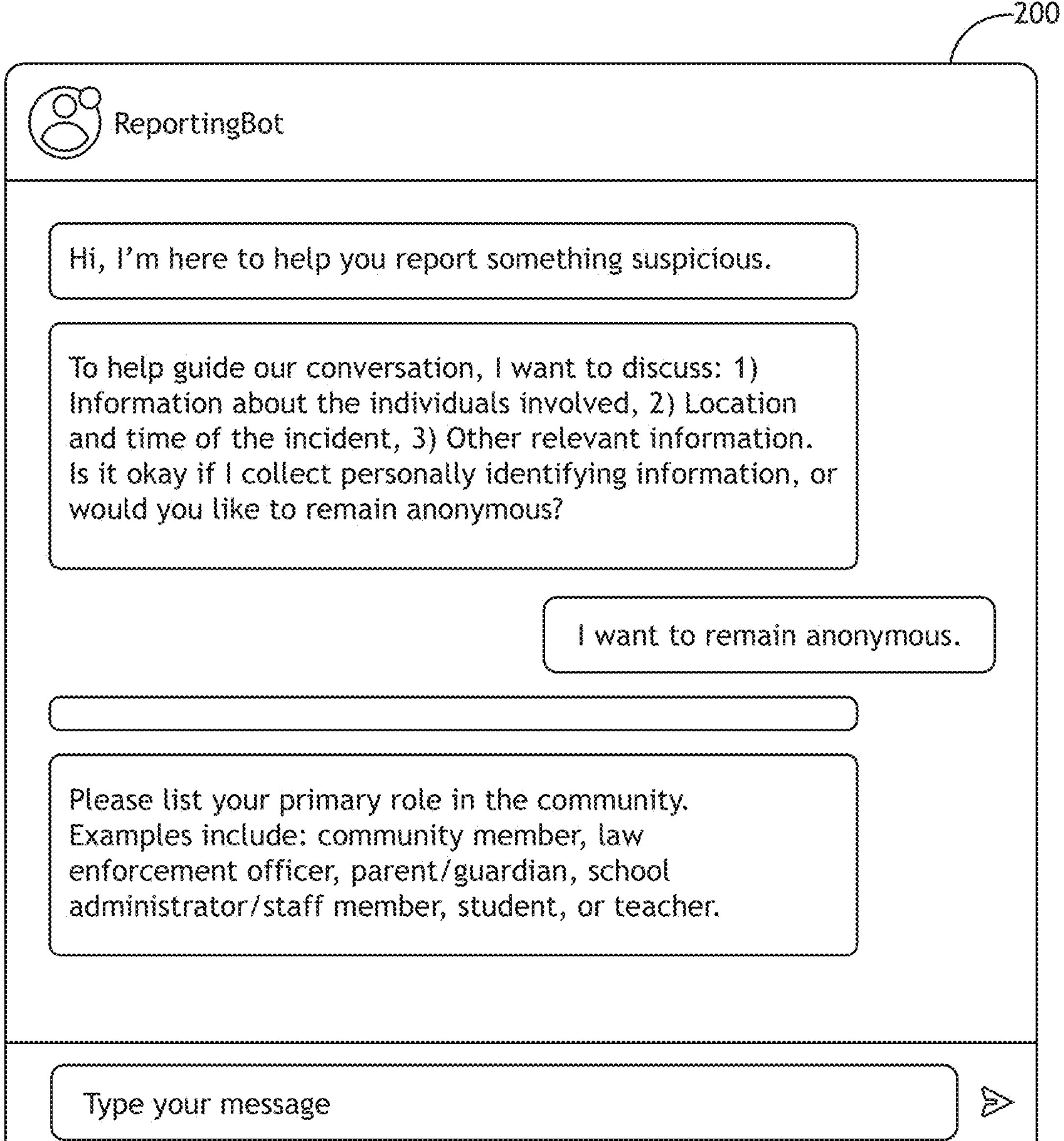
FIG. 2A is an illustration of a chatbot graphical user interface to be presented on a computer display, wherein the chatbot asks a user whether they wish to provide identifying information or prefer to remain anonymous, in accordance with an embodiment of the present disclosure.
Figure 2B:
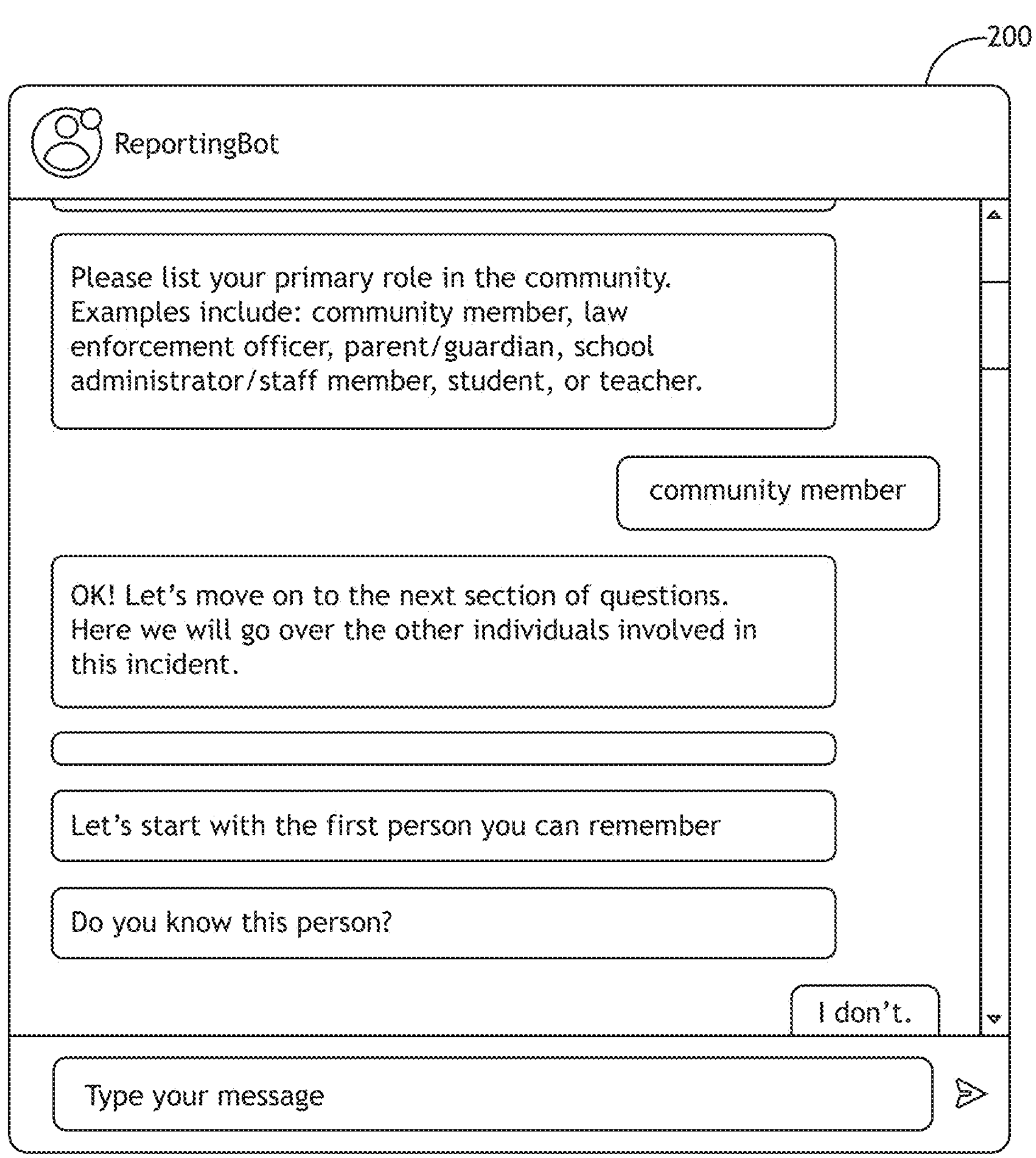
FIG. 2B is an illustration of a chatbot graphical user interface to be presented on a computer display, wherein the chatbot asks the user about their primary role in the community, in accordance with an embodiment of the present disclosure.
Figure 2C:
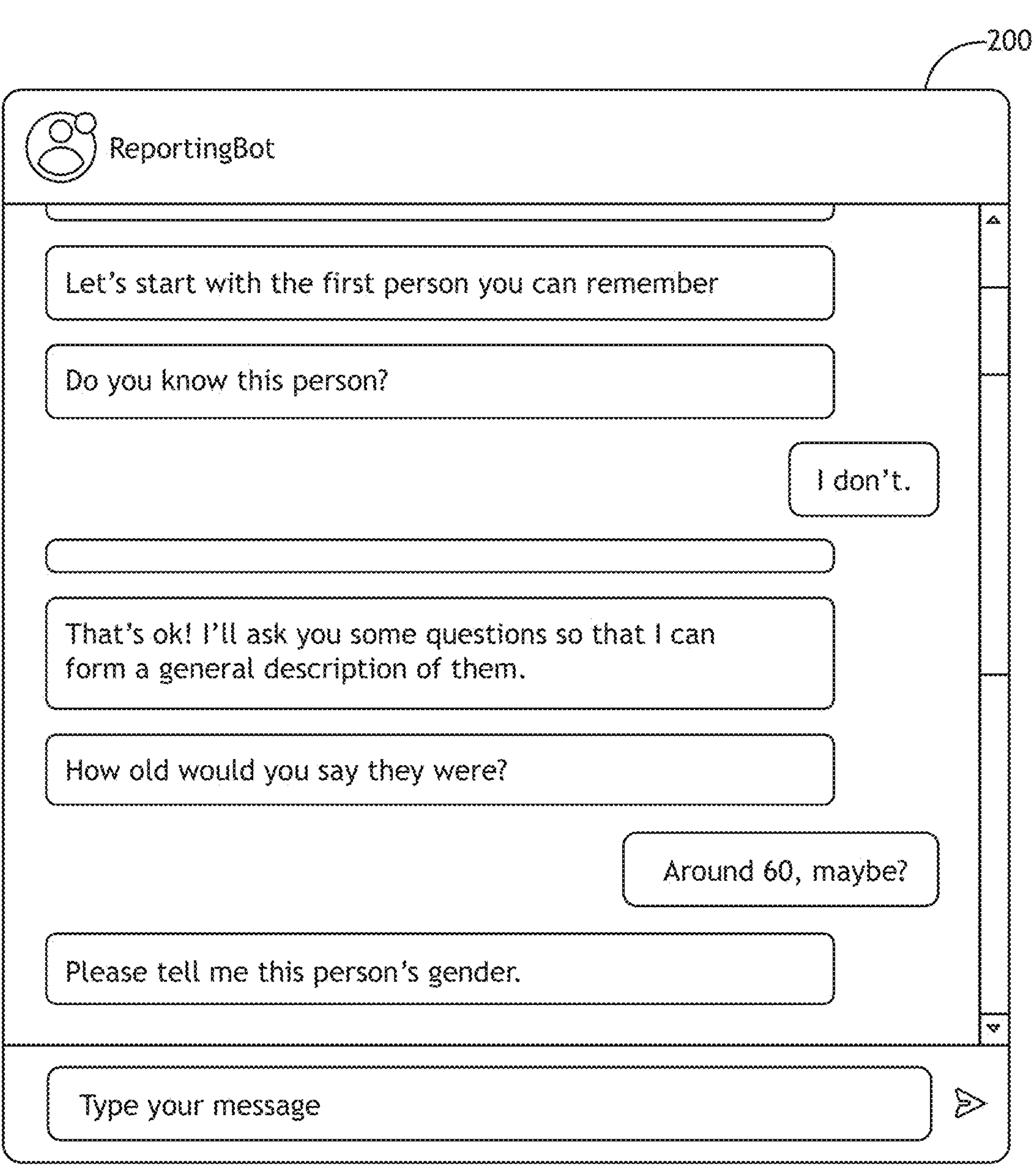
FIG. 2C is an illustration of a chatbot graphical user interface to be presented on a computer display, wherein the chatbot asks the user whether they can remember a person involved in a potentially suspicious incident, in accordance with an embodiment of the present disclosure.
Figure 2D:
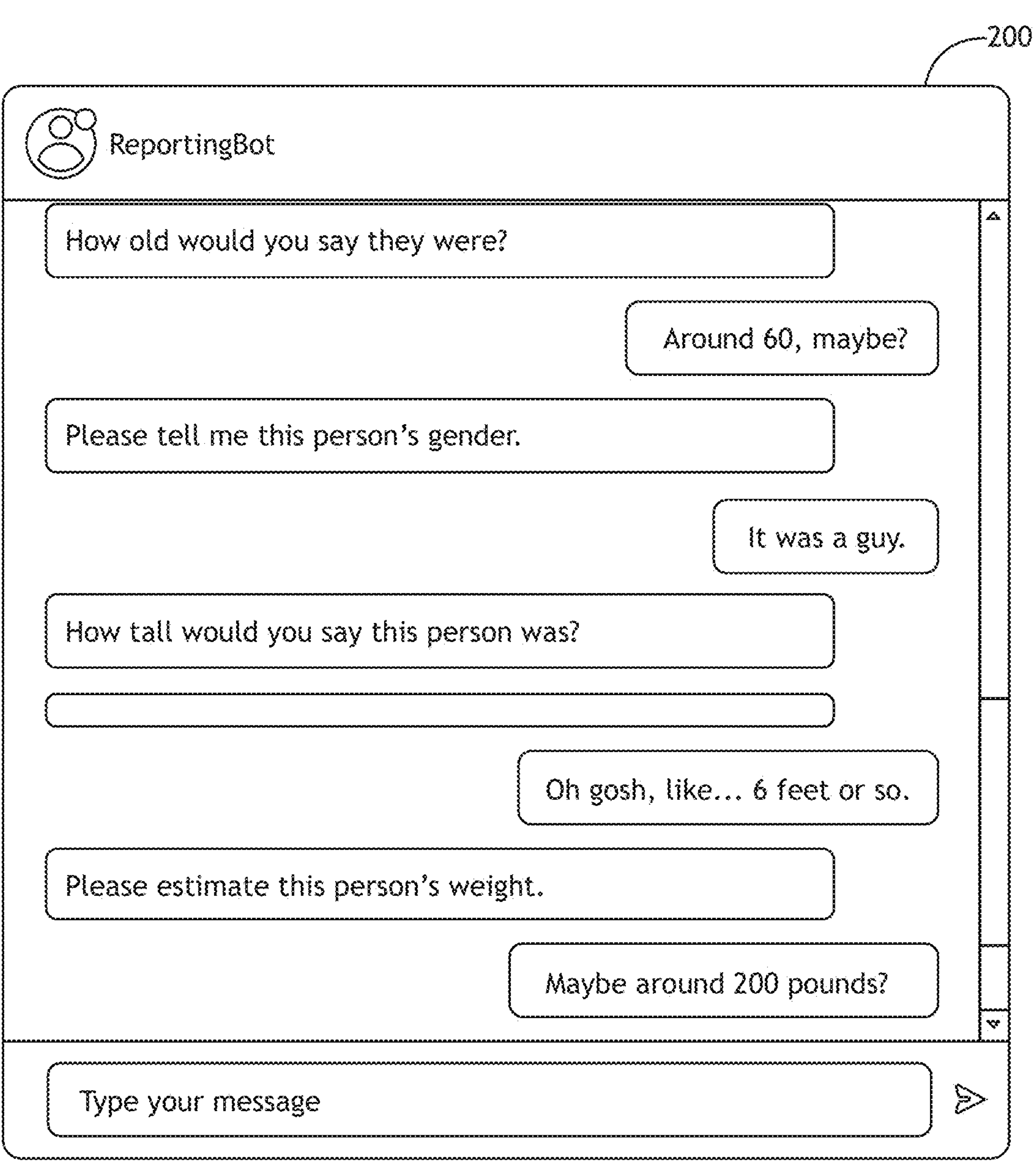
FIG. 2D is an illustration of a chatbot graphical user interface to be presented on a computer display, wherein the chatbot asks the user for answers to questions associated with demographic information about the person involved in the potentially suspicious incident, in accordance with an embodiment of the present disclosure.
Figure 2E:
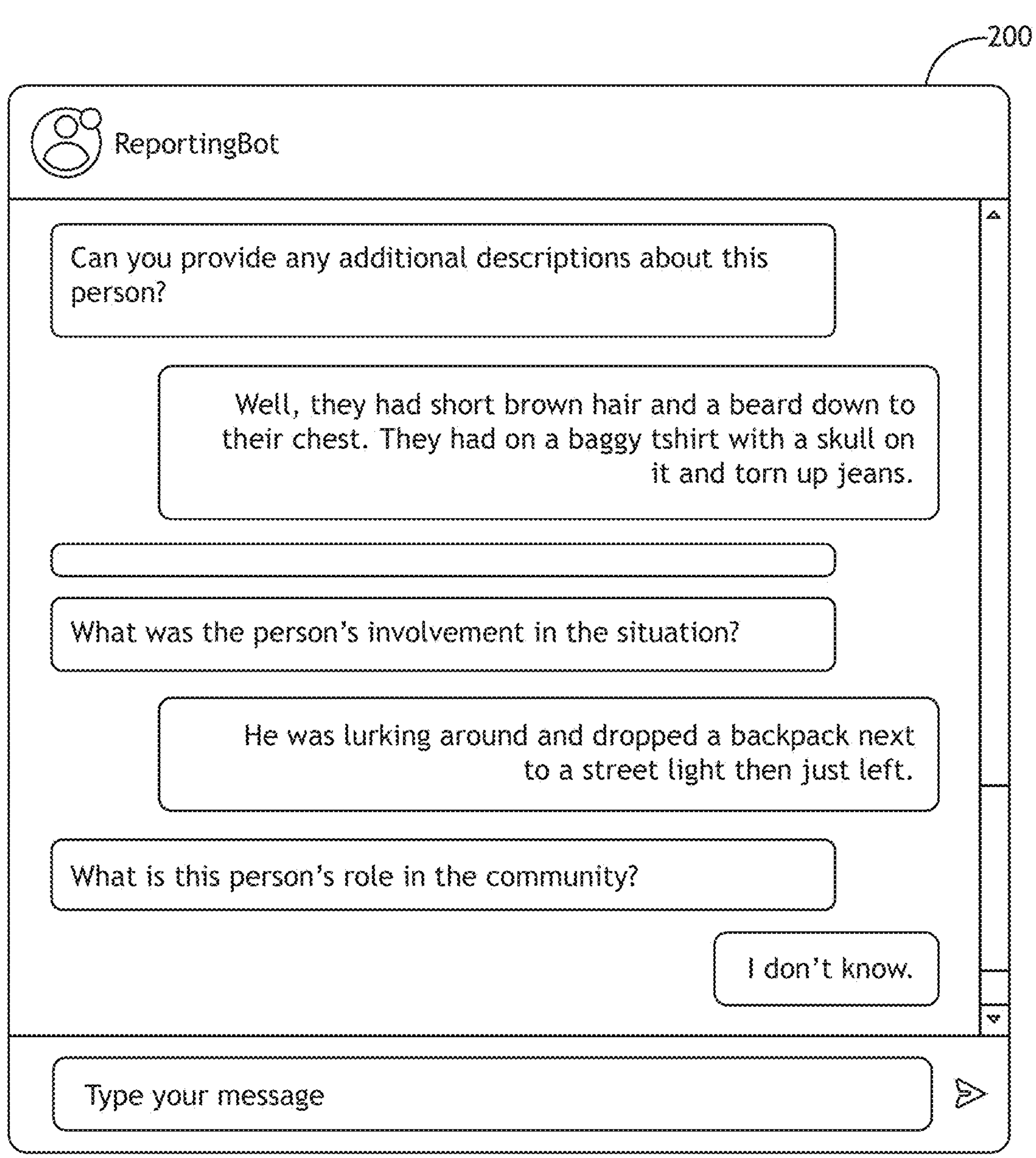
FIG. 2E is an illustration of a chatbot graphical user interface to be presented on a computer display, wherein the chatbot asks the user about the persons involvement in the potentially suspicious incident and about the persons role in the community, in accordance with an embodiment of the present disclosure.
Figure 2F:
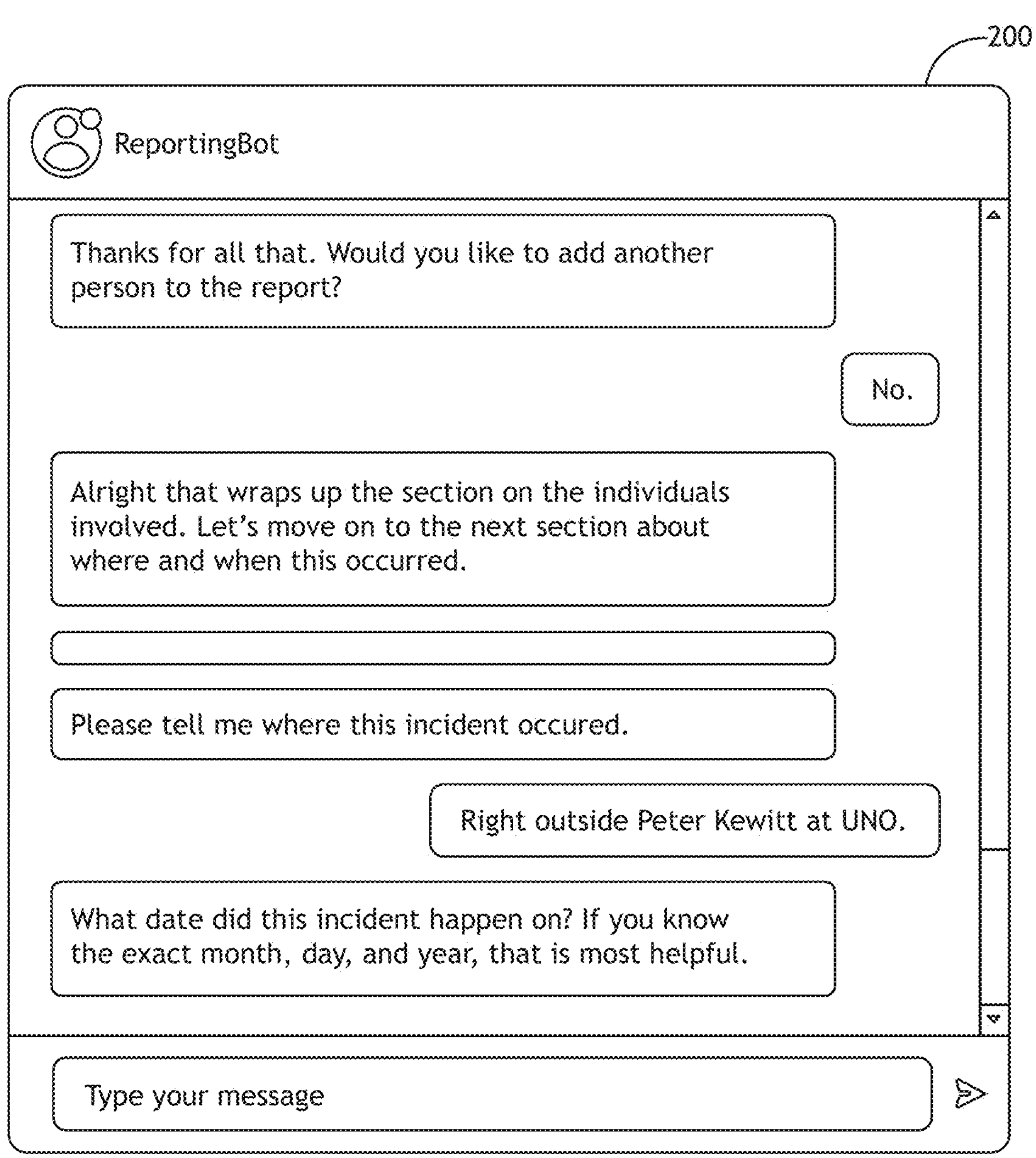
FIG. 2F is an illustration of a chatbot graphical user interface to be presented on a computer display, wherein the chatbot asks the user whether they would like to report any other persons involved in the potentially suspicious incident, and wherein the chatbot asks the user about the location and time of the potentially suspicious incident, in accordance with an embodiment of the present disclosure.
Figure 2G:
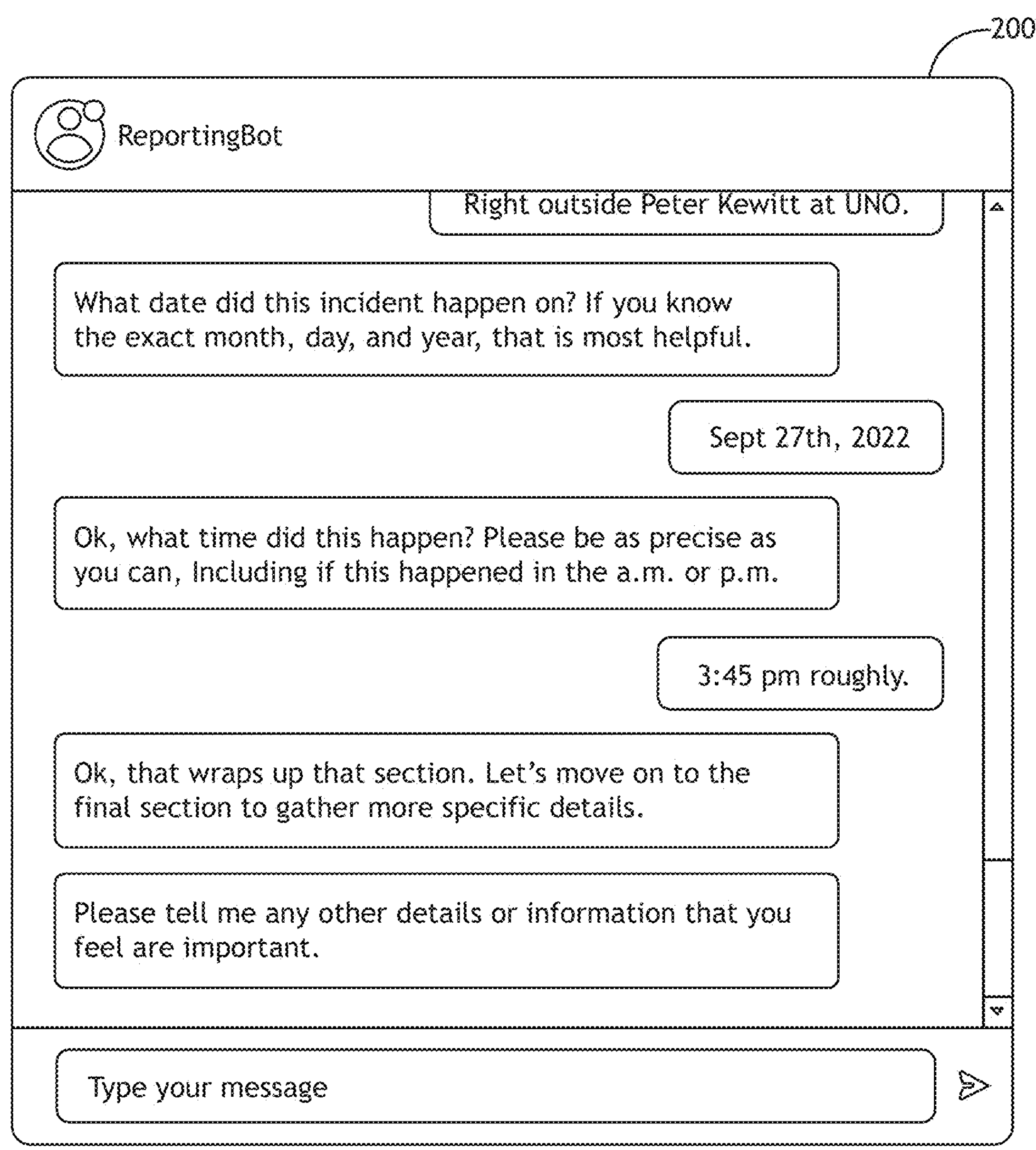
FIG. 2G is an illustration of a chatbot graphical user interface to be presented on a computer display, wherein the chatbot asks the user about the time of the potentially suspicious incident and for any additional details or information that the user feels are important, in accordance with an embodiment of the present disclosure.
Figure 2H:
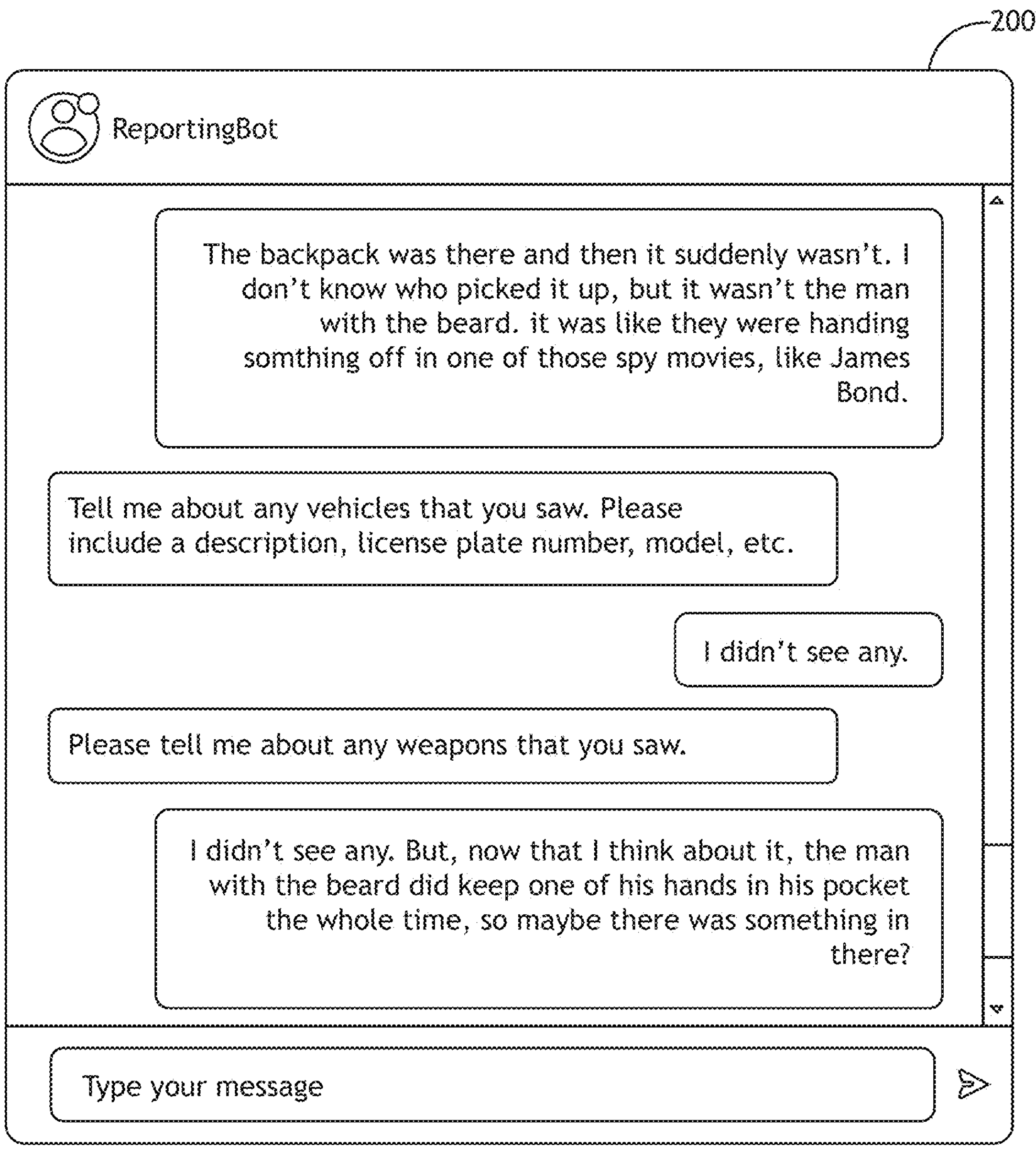
FIG. 2H is an illustration of a chatbot graphical user interface to be presented on a computer display, wherein the chatbot asks the user additional questions based on specific words or phrases in the additional details or information provided by the user, in accordance with an embodiment of the present disclosure.
Figure 2I:
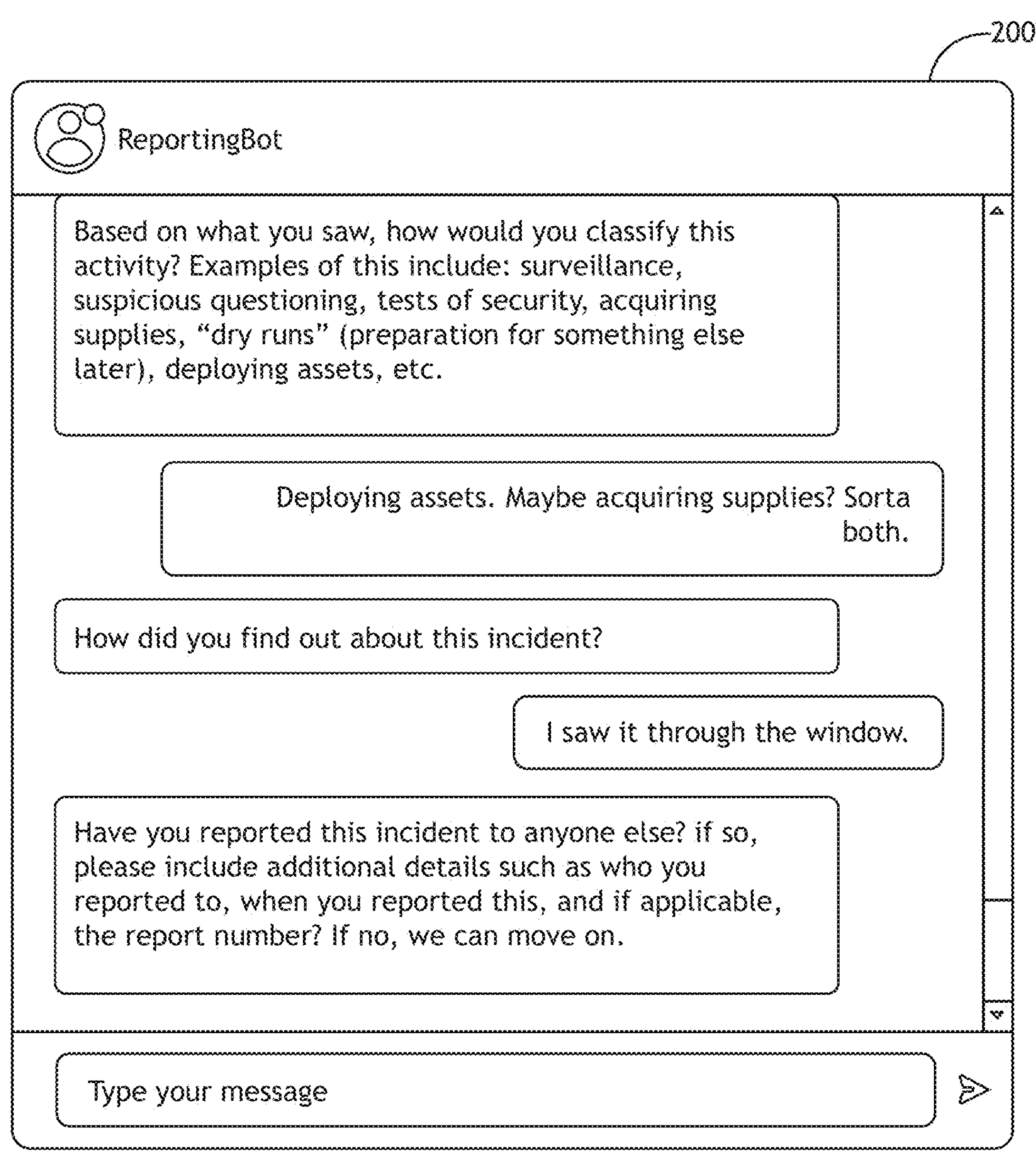
FIG. 2I is an illustration of a chatbot graphical user interface to be presented on a computer display, wherein the chatbot asks the user to classify the type of activity that they witnessed during the potentially suspicious incident, how they found out about the incident, and whether the user had reported the incident to anyone else, in accordance with an embodiment of the present disclosure.
Figure 2J:
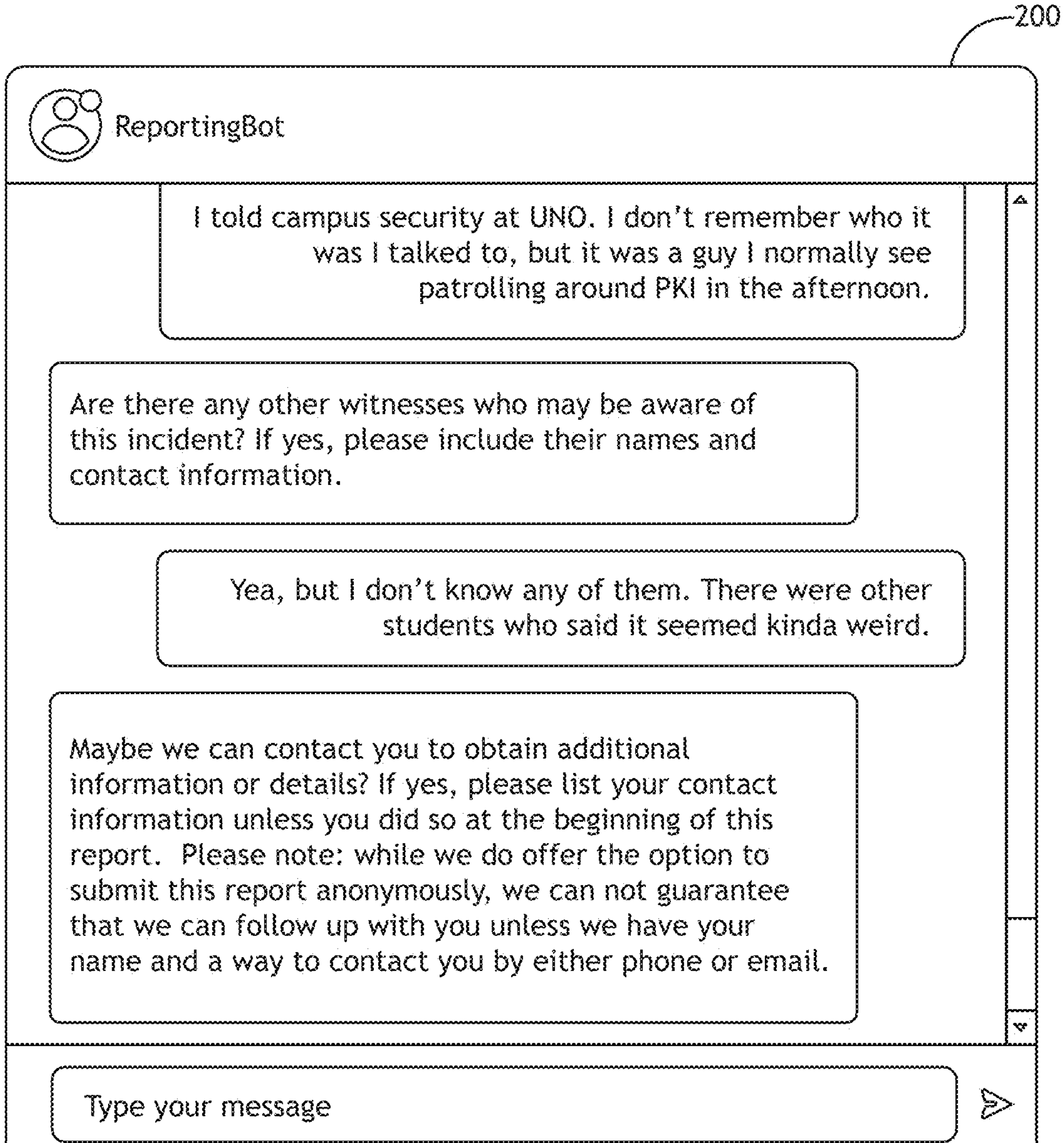
FIG. 2J is an illustration of a chatbot graphical user interface to be presented on a computer display, wherein the chatbot asks the user about any other people that may have witnessed the potentially suspicious incident, in accordance with an embodiment of the present disclosure.
Figure 2K:
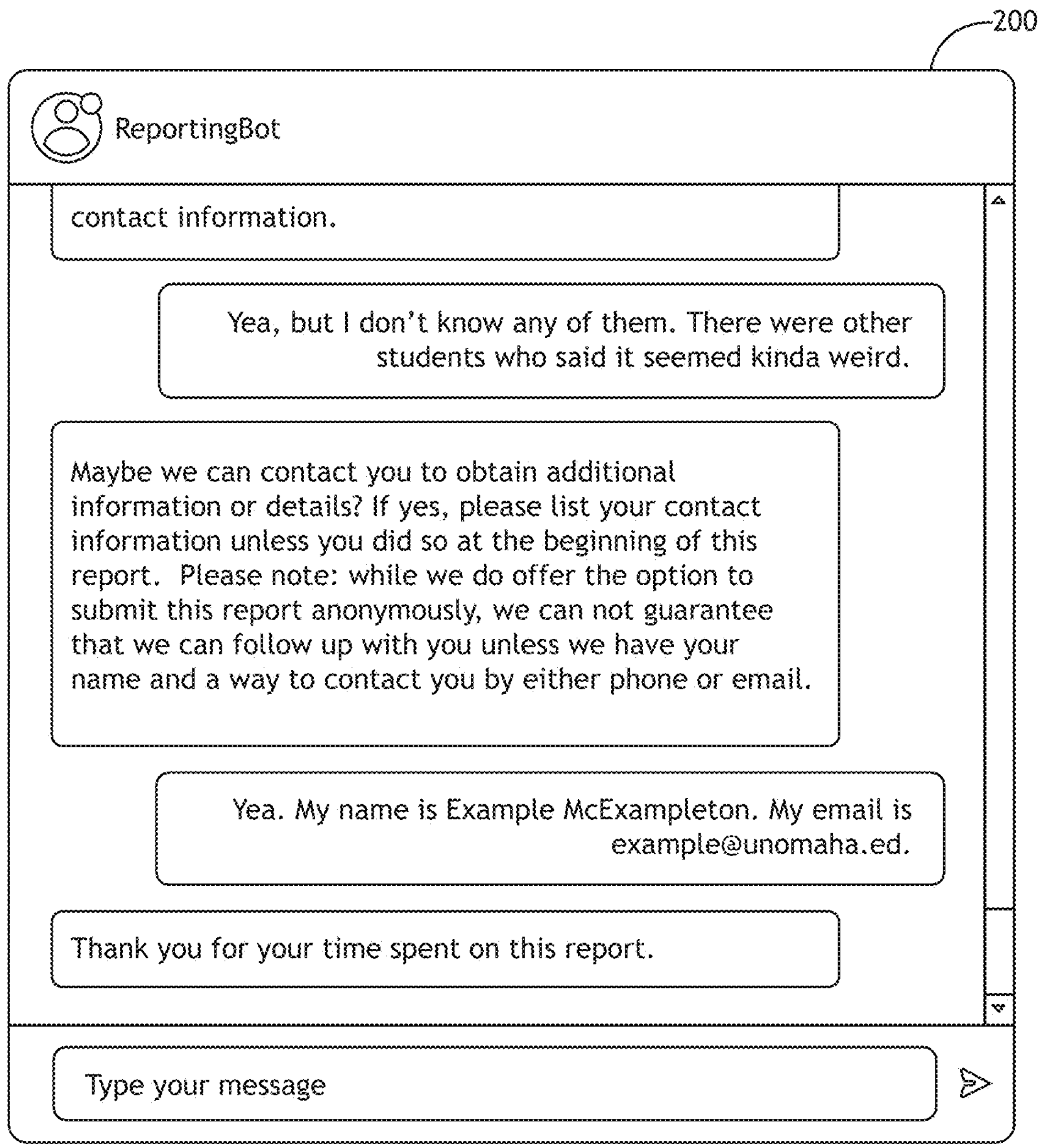
FIG. 2K is an illustration of a chatbot graphical user interface to be presented on a computer display, whether the chatbot asks if the user would like to be contacted if additional information or details need to be obtained—if yes, to provide their contact information, in accordance with an embodiment of the present disclosure.

The chatbot 200 may request response data associated with a threat inquiry, and user input response data is then recorded and analyzed by the computer 100 to direct additional questioning or information presented to the user. This allows for conversational reporting of suspicious activity. For example, FIGS. 2A through 2K show screenshots of an example dialogue between a user and the chatbot 200, In some embodiments, the chatbot 200 may initiate a conversation by asking the user whether they wish to remain anonymous (e.g., see FIG. 2A). As shown in FIG. 2B, the chatbot 200 may also ask the user about general information (e.g., their title/status in the community, relationship to places/people involved, etc.).

The chatbot 200 may be further configured to identify what things to report through the conversational information discovery around what is flagged as suspicious. For example, in FIG. 2C, the chatbot 200 asks the user whether they can remember a person involved in a potentially suspicious incident and whether they know the person. Then, in FIG. 2D, the chatbot 200 asks the user for answers to questions associated with demographic information about the person involved in the potentially suspicious incident.

The chatbot 200 may be configured to transition from directed questioning (e.g., FIG. 2D) to open-ended questioning (e.g., FIG. 2E), and vice-versa, based on the user input response data and to allow the user opportunities to provide additional information. For example, in FIG. 2E, the chatbot 200 asks the user whether they can provide any additional descriptions about the person involved in the potentially suspicious incident. In this case, the chatbot 200 has transitioned to open-ended questioning so that the user has an opportunity to provide information that may not have been requested during the directed questioning. This also provides a more conversational experience for the user. The computer 100 may be hard programmed to make this transition (e.g., open-ended question is programmed to come after a predetermined series of directed questions). In other situations, the chatbot 200 may transition from directed questioning to open-ended questioning if the directed questions do not yield sufficient information. For example, the chatbot 200 may transition to open-ended questioning if certain information is not ascertained after a series of directed questions or if the user provides null answers (e.g., "I don't know", "not sure", etc.) to a predetermined number of questions. The computer 100 may be programmed to make this transition based on certain rules/conditions (e.g., present open-ended question after N number of null answers, where N is an integer; or present open-ended question if certain facts (e.g., time, place, color, dimensions, etc.) are not provided after a series of directed questions.

The chatbot 200 may be configured to identify suspicious activity based on user input response data by performing natural language analysis and/or searching the user input response data for threat related words or phrases. Furthermore, the chatbot 200 may be configured to utilize the results of this analysis to transition between questioning modes (e.g., open-ended questioning vs. directed questioning) and/or to inform an intelligent question-path selection algorithm. For example, in FIGS. 2G and 2H, the chatbot 200 asks the user for any additional details or information that the user feels are important and then asks the user additional (directed) questions based on specific words or phrases in the additional details or information provided by the user.

In some embodiments, the chatbot 200 is configured to employ predictive labeling and intelligent question-path selection based on an initial event description. For example, the chatbot 200 may be configured to request response data by: requesting freeform response data associated with the threat inquiry; and transitioning to intelligent question-path selection to collect additional response data associated with the threat inquiry, wherein the intelligent question-path selection is prompted by the freeform response data. In other words, the chatbot 200 may provide an open-ended question (e.g., "Describe what you are concerned about?") to allow a user to report details of an event/incident without much guidance. This freeform user response data is then analyzed to label certain words, phrases, or identifying information. These predictive labels can then be used to guide a series of directed questions to ascertain event details or information that may be of interest, such as the presence/absence of iconography or ritualistic behavior linked to an extremist group or any other details that may be necessary to perform an investigation.

Language understanding and dynamic path determination allows the user to control the flow of the conversation. This allows the user to maintain complete control over the amount of information that he or she shares, thus preserving user privacy and inspiring trust and confidence in the chatbot 200.

Dynamically adjusted language understanding model implemented via various machine learning algorithms may be used to accommodate reasonable typographical errors from the user. In some embodiments, the chatbot 200 is configured to use a model that extrapolates meaning from mistyped words using contextual cues, user input history, and commonly input responses from other applicants to arrive at the most reasonable assumption.

The chatbot 200 allow users to report suspicious activities to local authorities with greater convenience, usability, and trust than current systems allow. It may rely on state of the art natural language processing and understanding models to allow for human-like communication between the reporting individual and the chatbot 200. In some embodiments, the chatbot 200 leverages generative pretrained transformer (GPT) and/or any other large language models (LLMs) to assess the completion and sufficiency user input. This allows the system to gather all information required for law enforcement to act on the report while continuously monitoring the direction of the conversation and dynamically adapting to meet the needs of each user on a per-instance basis.

The chatbot 200 may continuously monitor the direction of the conversation and can dynamically generate possible conversational prompts based on the user's manner of speech, deduce user intent and tone through conversational cues, and reduce large conversations into a small set of actionable bullet points for law enforcement agents to act on. No current system on the market today can match even one of these features. Through their interaction with the chatbot 200, users can share highly actionable information with law enforcement officers without experiencing the discomfort that is inherent to current reporting methods.

After gathering information via the chatbot 200, the system generates a report based on the user input response data. Users may remain anonymous while retaining the ability to check status of the report or enter additional information, for example, through the use of tokens, unique URL for accessing report status, or other means.

Figure 3:
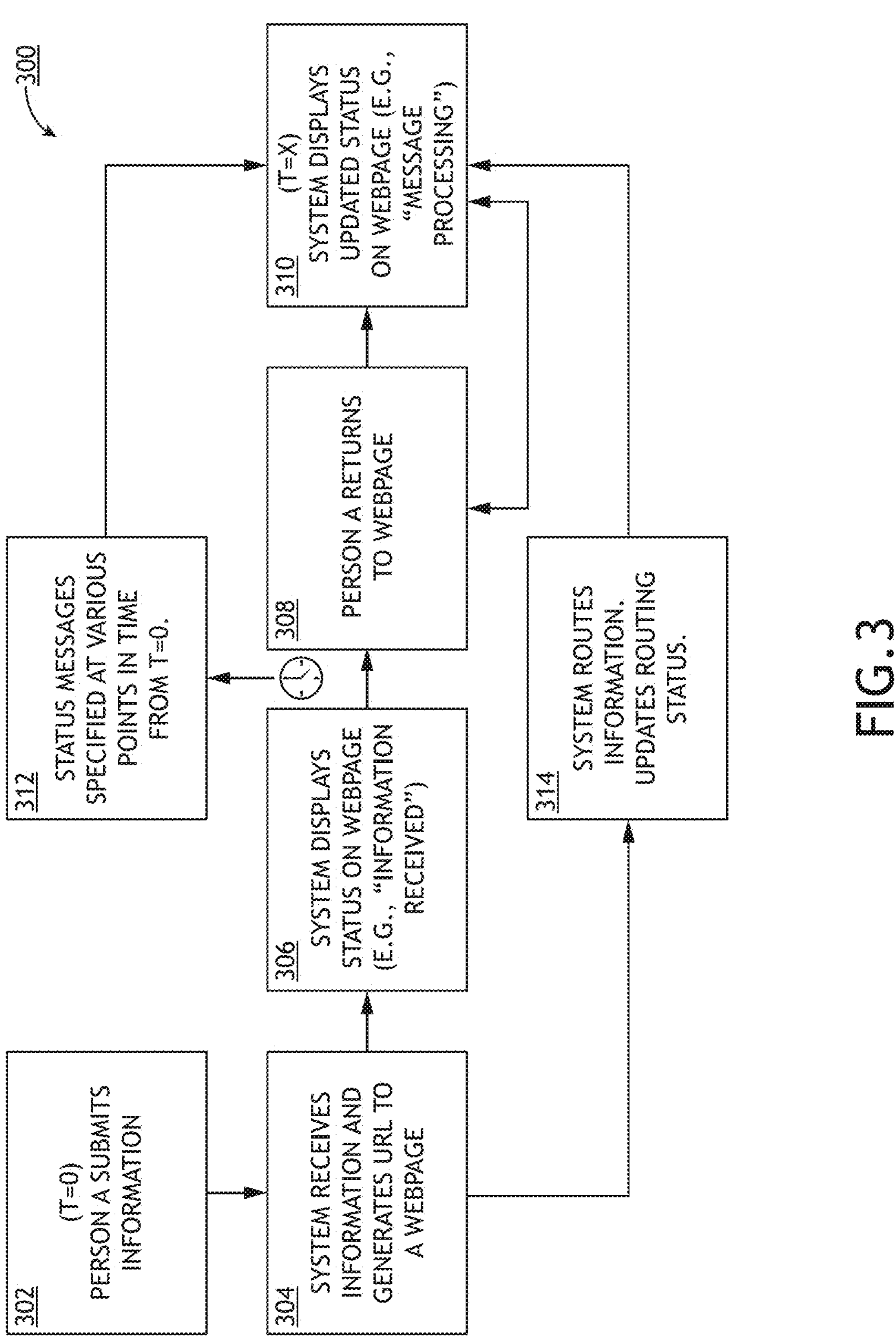
FIG. 3 is a flow diagram illustrating a process executed by one or more computers to present a portal (e.g., webpage and/or chatbot) for receiving, tracking, and monitoring anonymous submissions, in accordance with an embodiment of the present disclosure.

In some embodiments, the system allows for anonymous submission tracking with intelligent updates. For example, FIG. 3 is flow diagram illustrating a process 300 executed by the one or more computers 100 to present a portal for receiving, tracking, and monitoring anonymous submissions.

The process 300 includes presenting a portal (e.g., chatbot 200) via a user interface device (e.g., display, touchscreen, etc.) and receiving information submitted via the portal (block 302). For example, the user interface device may display a web portal on a webpage or App interface that allows the user to enter information in the form a freeform text, a structured form, a report, a questionnaire, a chatbot conversation, data/media uploads, etc. This information may be in the form of an anonymous submission. Thus, in order to allow the information source (hereinafter referred to as "Person A") to re-access the information, view status updates associated with the information, and/or submit additional information, a URL to a webpage associated with the information is generated (block 304). The webpage may present current/updated status associated with the information (block 306). For example, after the information is first submitted (T=0), the webpage may display a status of "information received." At any point in time (T=x), Person A may return to the webpage (block 308), and the webpage will display an updated status (e.g., "processing," "additional information required," "investigation opened," "investigation in process," "investigation closed," etc.) (block 310).

As progress on a submission is made or after key temporal milestones are reached, intelligent status updates may be generated that are unique to Person A (block 312). For example, a system may be configured to increase likelihood of submission, so status updates would be tailored to enhance Person A's sense of contribution or satisfaction from submission. Alternative outcomes might be desired so process 300 could intelligently adapt based on an analysis of the submission itself.

Additional information received at any point in time may be routed to the webpage and can also be used for status updates (block 314). The process 300 may further include: generating additional status updates corresponding to additional future points in time based upon the additional information.

Previously there was no way to track progress of anonymous tips submitted to online reporting systems (and other tracking systems such as voting, medical testing, or package shipping) and intelligently analyze a form submission to provide tailored status updates based on key individual differences and organization objectives.

In addition to accessing user input response data entered via the chatbot 200, reports, and/or status updates associated therewith, example implementations of the process 300 described above may include, but are not limited to: (1) allowing for tips reporting systems and hotlines to provide two way communication in a historically one way communication path; (2) allowing for medical test results to be given to individuals wishing to remain anonymous; (3) allowing for election information to be tracked without tying the information to an individual (e.g., "did your vote count?"); and/or (4) allowing for shipping tracking in situations where greater sender anonymity/security is desired (e.g., government, corporate, or other individuals not wanting initial shipping origin known by freight carriers or package recipients).

Individuals that anonymously return to the webpage/portal to check on the status of their submission may be required to enter a token (e.g., a unique identifier or code). In some embodiments, a token (e.g., QR code) may be used to launch the webpage. For example, Person A may be provided with a QR code during their portal session (e.g., before or after submitting information). Person A can print the QR code or take a screenshot. This QR code can then be scanned using a mobile device camera, desktop/notebook computer webcam, virtual QR code scanner, etc., in order to launch a browser that loads the webpage associated with the information submitted by Person A.

The "token" may include any object (in software or in hardware) which represents the right to perform some operation, for example: a session token, security token, hardware token, authentication token, cryptographic token, image for computer authentication (e.g., QR code), etc. Tokens (e.g., passcodes, security credentials, and the like) can be used to securely retrieve information. Software tokens are stored on a general-purpose electronic device such as a desktop, laptop, or mobile device, which may not always be accessible or can be lost if consumers change devices. Software tokens are usually linked with individuals, making using them anonymously difficult. Hardware tokens are credentials stored on dedicated hardware devices. While these can theoretically be made available anonymously, their cost makes it impractical to do so.

Figure 4:
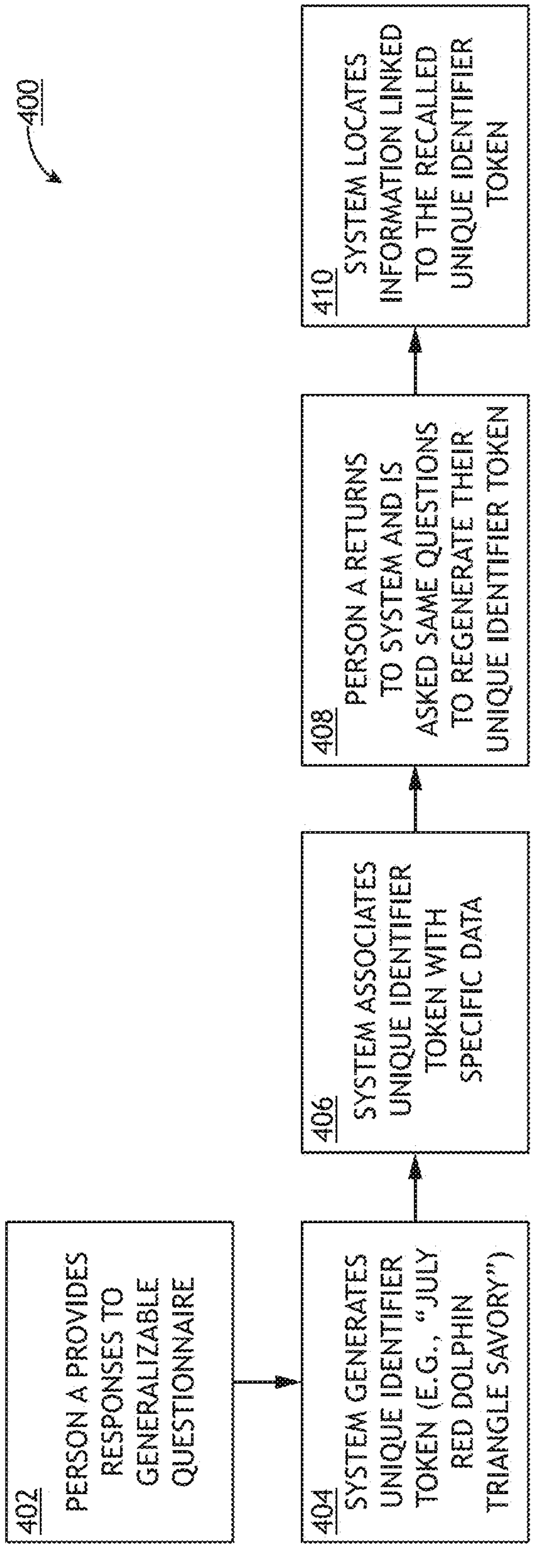
FIG. 4 is a flow diagram illustrating a process executed by one or more computers to generate a recallable anonymous unique identifier token, in accordance with an embodiment of the present disclosure.

In some embodiments, the system is configured to generate recallable anonymous unique identifier tokens. For example, FIG. 4 is flow diagram illustrating a process 400 executed by one or more computers 100 to generate a recallable anonymous unique identifier token that can be used to access the input response data entered via the chatbot 200, reports, and/or status updates associated therewith.

The process 400 includes: presenting a set of questions to the user at a first point in time (block 402); generating a unique identifier token for the user based on answers to the set of questions (block 404), wherein the unique identifier token is associated with secured data (i.e., the anonymous submission) provided by the user (block 406); presenting the set of questions to the user at another point in time (i.e., a point in time coming after the first point in time) and regenerating the unique identifier token for the user upon receiving the same answers to the same set of questions (block 408); and providing access to the secured data in response to regenerating the unique identifier token (block 410).

The system/process described above may generate a unique identifier token based on temporal, environmental, and/or individual factors. For example, the set of questions may comprise a generalizable questionnaire based on a researched set of questions that result in an anonymous identifier, which is both unique and non-identifying. Using input information that is easily recalled at a later date, the system/process generates a unique identifier token that can be linked with data and used to call up data records at a later date. This unique identifier token can be displayed in any combination of images, string of text, patterns/codes, etc.

In some embodiments, a token (e.g., QR code) can also be used to launch access to the system (e.g., by launching a webpage/portal). For example, the user may be provided with a QR code during their first session (e.g., before or after submitting information). The user can print the QR code or take a screenshot. This QR code can then be scanned using a mobile device camera, desktop/notebook computer webcam, virtual QR code scanner, etc., in order to launch a browser that loads a webpage associated with information previously submitted by the user. The system can then perform process 400 to grant/deny access to the information.

Figures 5A, 5B:
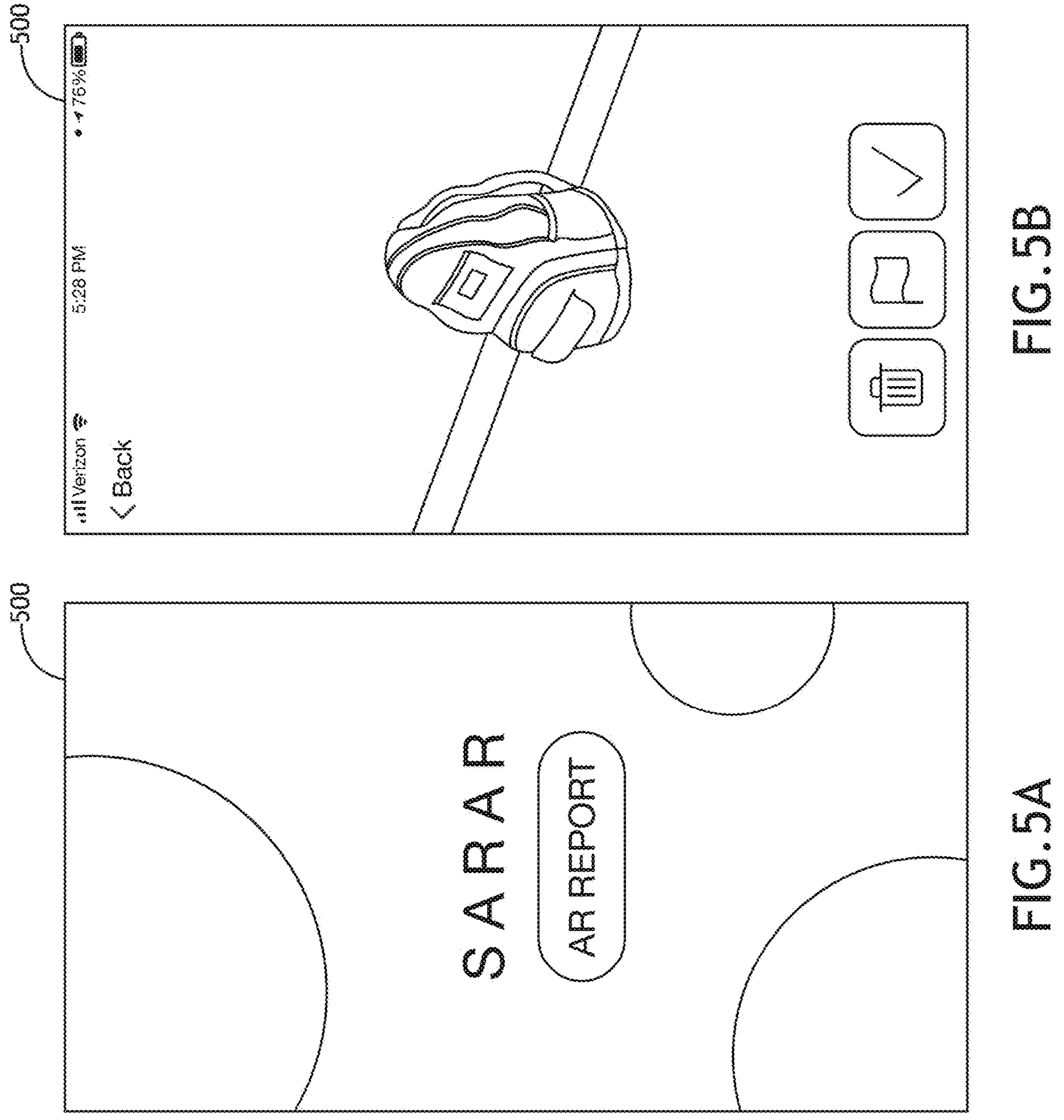
FIG. 5A is an illustration of an extended reality graphical user interface, in accordance with an embodiment of the present disclosure.
FIG. 5B is an illustration of a video stream presented via the extended reality graphical user interface, in accordance with an embodiment of the present disclosure.
Figures 5C, 5D:
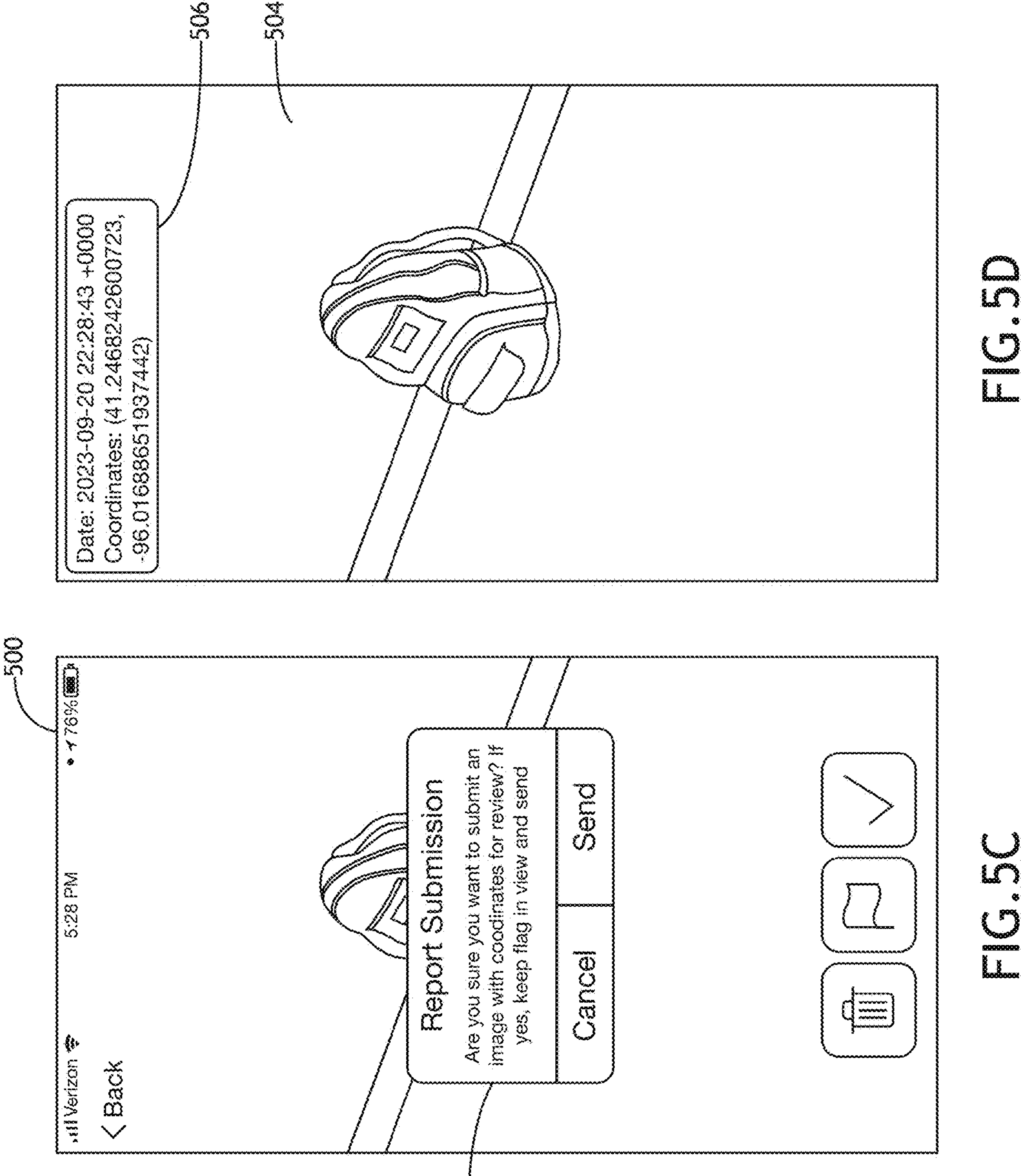
FIG. 5C is an illustration of a chatbot presented within the video stream via the extended reality chatbot graphical user interface, wherein the chatbot asks the user if they would like to submit an image with coordinates for review, in accordance with an embodiment of the present disclosure.
FIG. 5D is an illustration of user flagged image data (e.g., picture(s), snapshot(s), videoframe(s), etc.) taken from the extended reality video stream with time and location identifying information attached to, embedded within, or otherwise provided with the user flagged image data, in accordance with an embodiment of the present disclosure.

Referring now to FIGS. 5A through 5G, the chatbot technology described above (with reference to chatbot 200) may be implemented within an extended reality (XR) platform. For example, the computer 100 may be configured to present a chatbot 502 via a user interface device (e.g., a computer monitor or TV, mobile device display screen, head-mounted display, etc.) by displaying the chatbot 502 within a video stream presented through an extended reality graphical user interface 500. The chatbot 502 may request information (e.g., answers to questions) and may also receive media (e.g., images, video, audio, etc.) collected through the extended reality video stream. For example, FIG. 5A is an illustration of an extended reality graphical user interface 500, and FIG. 5B is an example of a video stream of an object observed through the extended reality graphical user interface 500. As shown in FIGS. 5C and 5D, the chatbot 502 is configured to collect user flagged image data 504 from the extended reality video stream with time and location identifying information 506, wherein the user flagged image data 504 is provided by the user in response to requesting response data associated with the threat inquiry via the chatbot 502. For example, in FIG. 5C, the chatbot 502 asks the user if they would like to submit an image with coordinates for review, and in FIG. 5D, the user flagged image data 504 (e.g., picture(s), snapshot(s), videoframe(s), etc.) is collected from the extended reality video stream with time and location identifying information attached to, embedded within, or otherwise provided with the user flagged image data. This image data 504 is then sent as part of the user's report/submission.

Figure 5E:
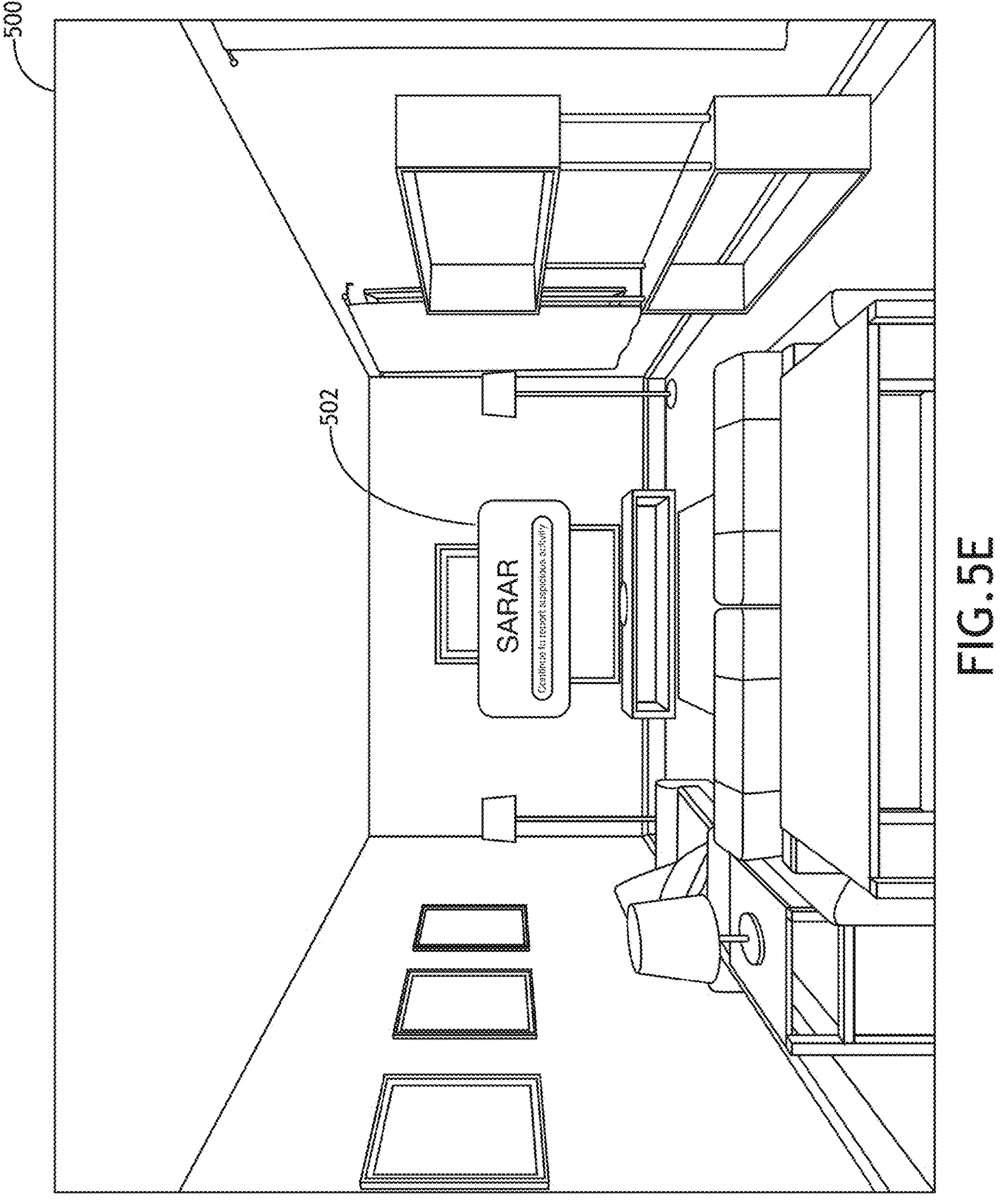
FIG. 5E is an illustration of a video stream presented via the extended reality graphical user interface, in accordance with an embodiment of the present disclosure.
Figure 5F:
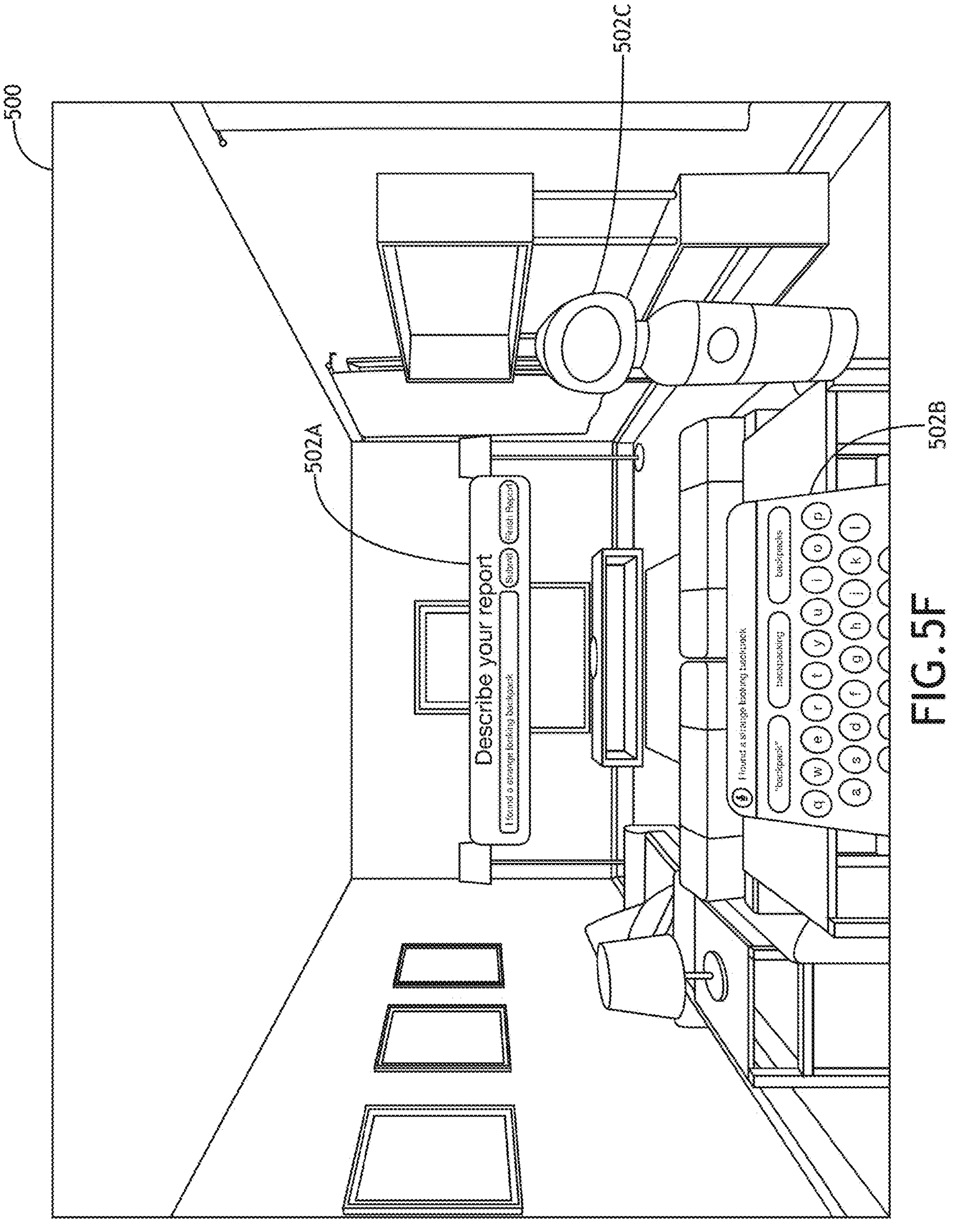
FIG. 5F is an illustration of a chatbot presented within the video stream via the extended reality chatbot graphical user interface, wherein the chatbot asks the user to describe their report, in accordance with an embodiment of the present disclosure.
Figure 5G:
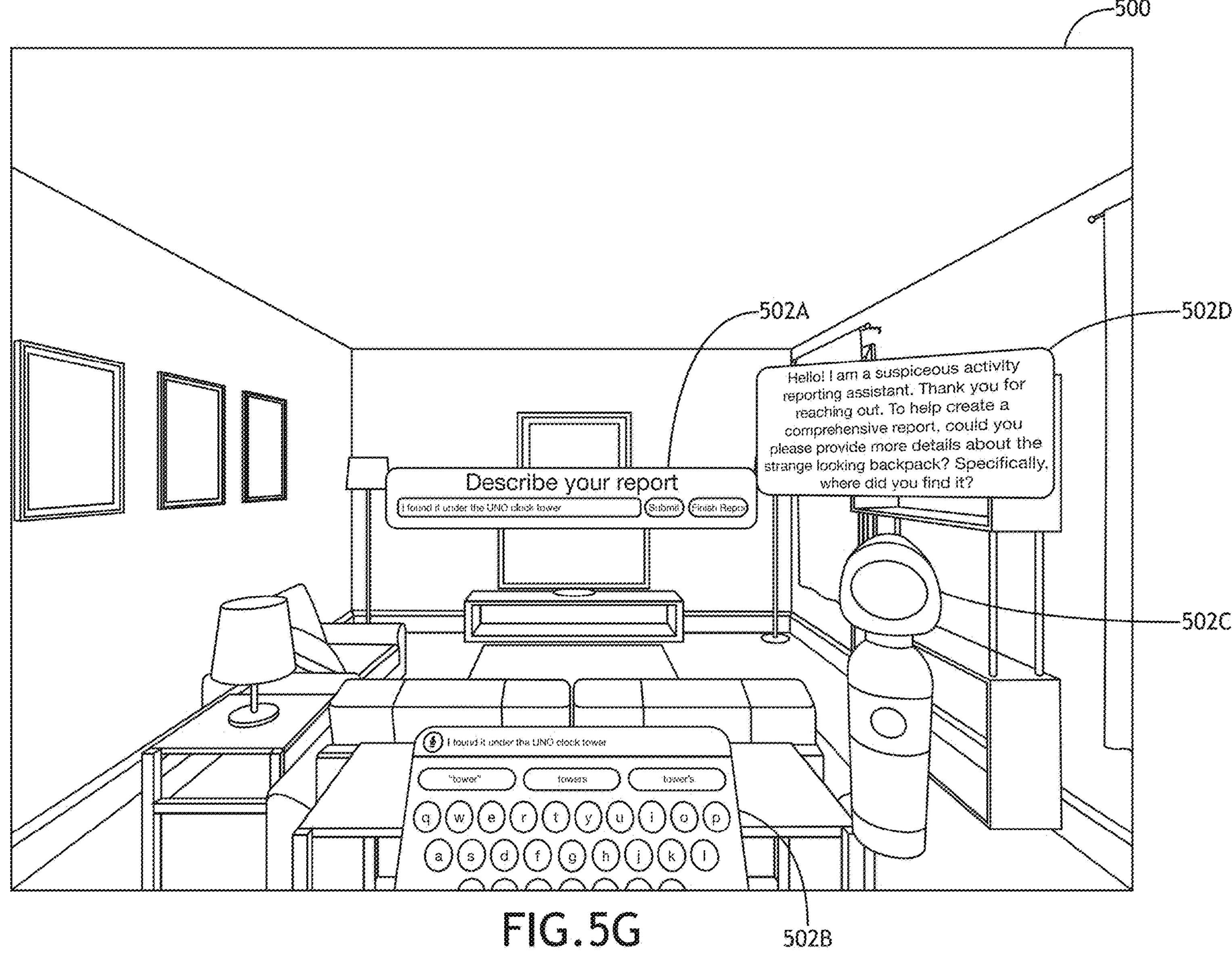
FIG. 5G is an illustration of a chatbot presented within the video stream via the extended reality chatbot graphical user interface, wherein the chatbot asks the user additional questions about their report, in accordance with an embodiment of the present disclosure.

FIGS. 5E through 5G illustrate additional examples of the extended reality graphical user interface 500 (e.g., after the user flagged image data is uploaded). For example, FIG. 5E is an illustration of a video stream presented via the extended reality graphical user interface 500 with the chatbot 502 presented within the extended reality video stream. FIG. 5F is also an illustration of the chatbot presented within the video stream via the extended reality chatbot graphical user interface 500, wherein the chatbot asks the user to describe their report. In FIGS. 5F and 5G, the chatbot is a more advanced interface including a dialogue box 502A, a user input section 502B (including a keyboard), and a chatbot avatar 502C. In FIG. 5G, the chatbot asks the user additional questions about their report by presenting the questions in a thought bubble 502D associated with the chatbot avatar 502C.

The spatial data XR capture system described above (aka "Suspicious Activity Reporting Augmented Reality" or the acronym "SARAR") is designed to revolutionize geospatial data capture and monitoring from handheld computer or head mounted display. This cutting-edge technology enables real-time spatial data collection and analysis in various commercial applications, with a particular focus on enhancing security and streamlining building and construction processes. The system leverages spatial computing technologies enabling first parties to identify, annotate, and capture physical world objects for review by third party.

SARAR allows users to place flags in their real-world environment for higher fidelity reporting using augmented reality (AR). Users can also describe their report conversationally to an artificial intelligence (AI) reporting bot. Reports and flagged items are then sent to a database for third-party review. Providing real spatial feedback may improve the quality and frequency of reports and also make the previously discussed chatbot technologies more immersive for the user.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A system for reporting and investigating threats, comprising one or more computer processors configured to:

present a chatbot via a user interface device;

request response data associated with a threat inquiry via the chatbot;

record user input response data;

generate a URL to a webpage associated with the user input response data; and present a status associated with the user input response data on the webpage, wherein the webpage is accessible by recalling a token, wherein the one or more computer processors are configured to first generate the token by presenting a set of questions to a user at a first point in time and generating a recallable anonymous unique identifier token for the user based on answers to the set of questions, and wherein the one or more computer processors are configured to recall the token by presenting the same set of questions to the user at another point in time, after the first point in time, and regenerating the recallable anonymous unique identifier token for the user upon receiving the same answers to the same set of questions.

2. The system of claim 1, wherein the one or more computer processors are configured to request the response data associated with the threat inquiry via the chatbot by requesting freeform response data associated with the threat inquiry via the chatbot and transitioning to intelligent question-path selection to collect additional response data associated with the threat inquiry, wherein the intelligent question-path selection is prompted by the freeform response data.

3. The system of claim 1, wherein the one or more computer processors are further configured to:

identify suspicious activity based on the user input response data by performing natural language analysis and searching the user input response data for threat related words or phrases.

4. The system of claim 1, wherein the one or more computer processors are further configured to:

generate status updates corresponding to future points in time from a first point in time at which the user input response data was submitted via the chatbot; and present an updated status based on the generated status updates when the webpage associated with the URL is accessed at a future point in time.

5. The system of claim 4, wherein the status updates are based on time and also based on actions associated with processing the user input response data.

6. The system of claim 4, wherein the one or more computer processors are further configured to:

receive additional information input by a user via the webpage associated with the URL; and generate additional status updates corresponding to additional future points in time based upon the additional information.

7. The system of claim 1, wherein the one or more computer processors are configured to:

present the chatbot via the user interface device by displaying the chatbot within an extended reality video stream; and receive user flagged image data from the extended reality video stream with time and location identifying information, wherein the user flagged image data is provided by the user in response to requesting response data associated with the threat inquiry via the chatbot.

8. The system of claim 1, wherein the one or more computer processors employ a large language model (LLM) to process user input response data received via the chatbot.

9. A method of reporting and investigating threats, comprising:

presenting a chatbot via a user interface device;

requesting response data associated with a threat inquiry via the chatbot;

recording user input response data; and presenting a status associated with the user input response data on the webpage, wherein the webpage is accessible by recalling a token, wherein the token is first generated by presenting a set of questions to a user at a first point in time and generating a recallable anonymous unique identifier token for the user based on answers to the set of questions, and wherein the token is recalled by presenting the same set of questions to the user at another point in time, after the first point in time, and regenerating the recallable anonymous unique identifier token for the user upon receiving the same answers to the same set of questions.

10. The method of claim 9, wherein the response data associated with the threat inquiry is collected via the chatbot by requesting freeform response data associated with the threat inquiry via the chatbot and transitioning to intelligent question-path selection to collect additional response data associated with the threat inquiry, wherein the intelligent question-path selection is prompted by the freeform response data.

11. The method of claim 9, further comprising:

identifying suspicious activity based on the user input response data by performing natural language analysis and searching the user input response data for threat related words or phrases.

12. The method of claim 9, further comprising:

generating status updates corresponding to future points in time from a first point in time at which the user input response data was submitted via the chatbot; and presenting an updated status based on the generated status updates when the webpage associated with the URL is accessed at a future point in time.

13. The method of claim 12, wherein the status updates are based on time and also based on actions associated with processing the user input response data.

14. The method of claim 12, further comprising:

receiving additional information input by a user via the webpage associated with the URL; and generating additional status updates corresponding to additional future points in time based upon the additional information.

15. The method of claim 9, further comprising:

presenting the chatbot via the user interface device by displaying the chatbot within an extended reality video stream; and receiving user flagged image data from the extended reality video stream with time and location identifying information, wherein the user flagged image data is provided by the user in response to requesting response data associated with the threat inquiry via the chatbot.

16. The method of claim 9, wherein the method employs a large language model (LLM) to process user input response data received via the chatbot.

17. A system for collecting anonymous reports from users and allowing the users to re-access and track said reports, comprising one or more computer processors configured to:

request response data associated with an inquiry;

record user input response data;

generate a URL to a webpage associated with the user input response data; and present a status associated with the user input response data on the webpage, wherein the webpage is accessible by recalling a token, wherein the one or more computer processors are configured to first generate the token by presenting a set of questions to a user at a first point in time and generating a recallable anonymous unique identifier token for the user based on answers to the set of questions, and wherein the one or more computer processors are configured to recall the token by presenting the same set of questions to the user at another point in time, after the first point in time, and regenerating the recallable anonymous unique identifier token for the user upon receiving the same answers to the same set of questions.

18. The system of claim 17, wherein the one or more computer processors are further configured to:

generate status updates corresponding to future points in time from a first point in time at which the user input response data was submitted; and present an updated status based on the generated status updates when the webpage associated with the URL is accessed at a future point in time.

19. The system of claim 18, wherein the status updates are based on time and also based on actions associated with processing the user input response data.

20. The system of claim 18, wherein the one or more computer processors are further configured to:

receive additional information input by a user via the webpage associated with the URL; and generate additional status updates corresponding to additional future points in time based upon the additional information.

* * * * *